June 1, 1937.  H. C. COPPINS  2,081,911
APPLYING MACHINE
Filed Dec. 3, 1932  7 Sheets-Sheet 2

INVENTOR.
HAROLD C. COPPINS,
BY Duell, Dunn & Anderson.
ATTORNEYS.

June 1, 1937.　　　H. C. COPPINS　　　2,081,911
APPLYING MACHINE
Filed Dec. 3, 1932　　　7 Sheets-Sheet 5

INVENTOR.
HAROLD C. COPPINS,
BY Duell, Dunn & Anderson.
ATTORNEYS.

INVENTOR.
HAROLD C. COPPINS,
BY Duell, Dunn & Anderson
ATTORNEYS.

Patented June 1, 1937

2,081,911

UNITED STATES PATENT OFFICE 2,081,911

APPLYING MACHINE

Harold C. Coppins, Buffalo, N. Y., assignor to F. N. Burt Company, Limited, Toronto, Ontario, Canada, a corporation of Ontario, Canada Application December 3, 1932, Serial No. 645,551

50 Claims. (Cl. 93—54.1)

This invention relates to an improved applying machine capable of use in numerous different associations, but primarily intended for employment in the receptacle-forming industry, and by means of which strip-applying operations in the manufacture of a receptacle may be performed in an improved manner.

An object of the invention is that of providing a machine of this type which is simply constructed to provide a unitary and compact apparatus capable of operating with minimum of attention, and at high speeds, for prolonged periods of time without failure.

Another object is to provide an apparatus of this type which is improved to adapt it to the better application of finishing or border strips to the lid or body flanges of receptacles.

Still another object of the invention is that of providing a machine functioning in an improved manner and more certainly to automatically prevent damage or jamming of the parts in the event that the supply of materials to the machine has been temporarily or otherwise exhausted.

Other objects of the invention will be in part pointed out in the following detailed description of an illustrative but preferred embodiment of the invention, and will be in part obvious in connection therewith.

The invention accordingly comprises the features of construction, combinations of elements and arrangements of parts which will be exemplified in the construction hereinafter set forth, and the scope of the application of which will be indicated in the claims.

Figures 1, 8:
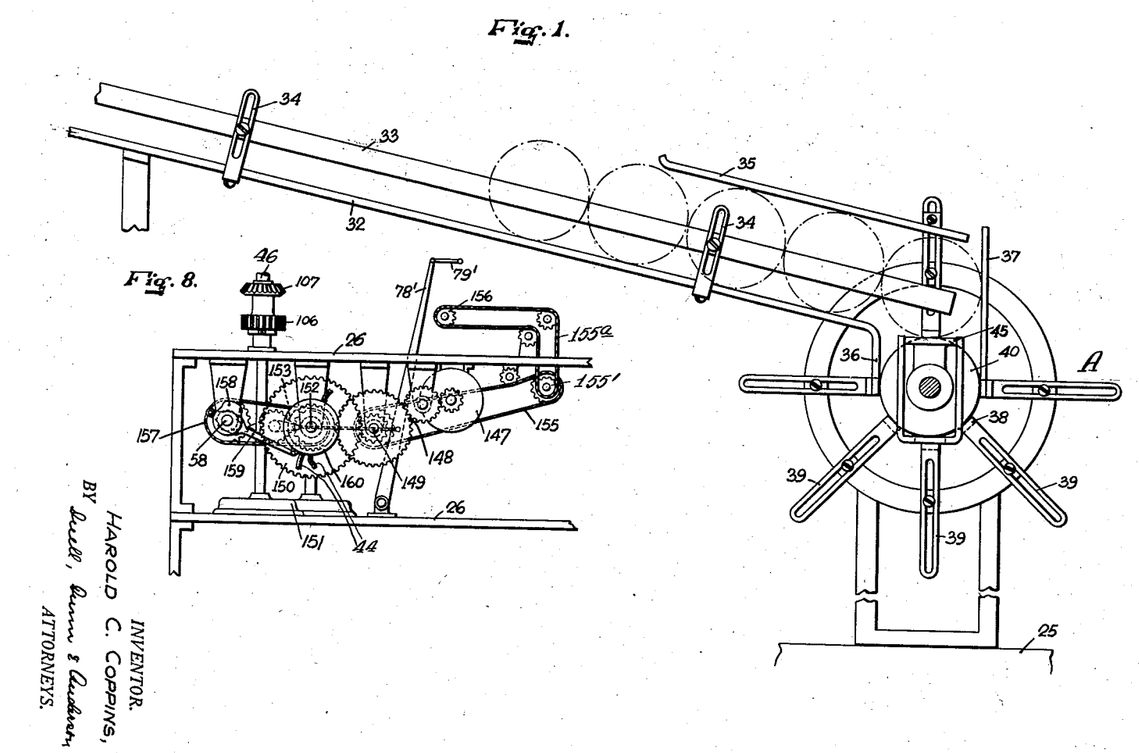
Fig. 1 is a fragmentary side elevation of the mechanism at the feeding station of the machine.
Fig. 8 is a somewhat diagrammatic view of the turret operating drive mechanism.
Figure 9:
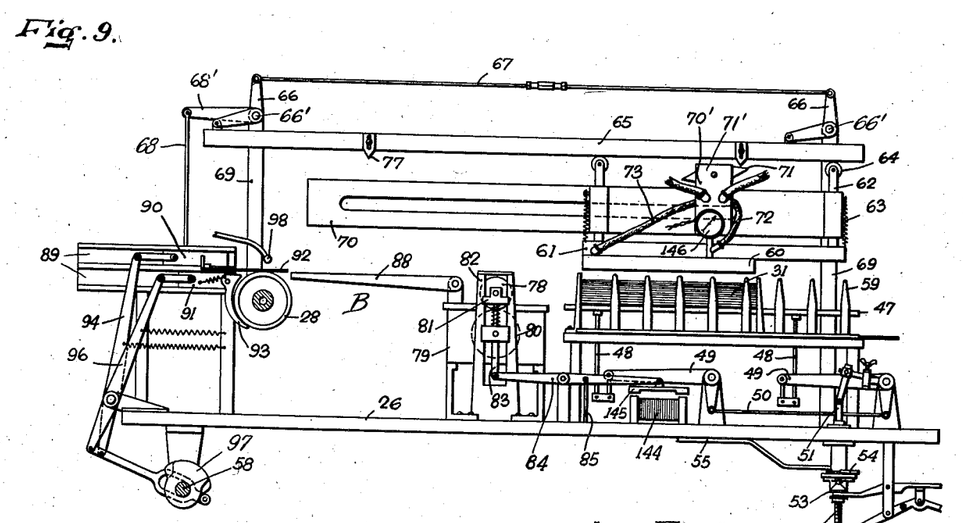
Fig. 9 is a side elevation showing the mechanism adjacent the strip supplying station of the machine.
Figure 21:
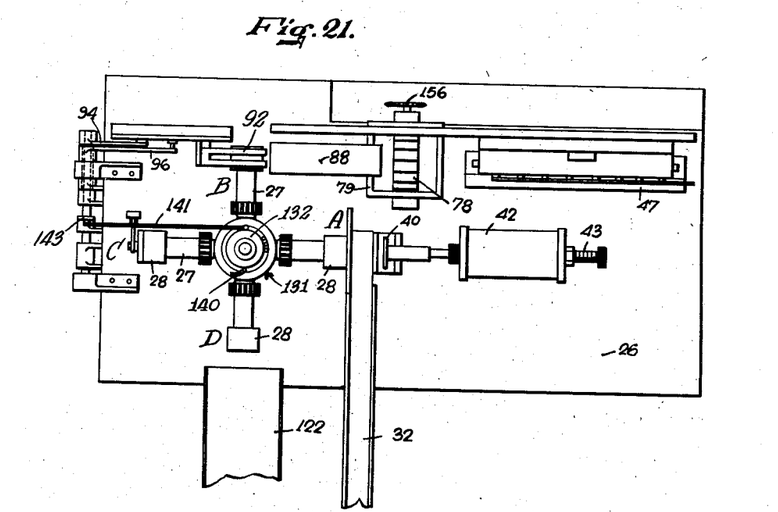
Fig. 21 is a top plan view of the mechanism.
Figure 22:
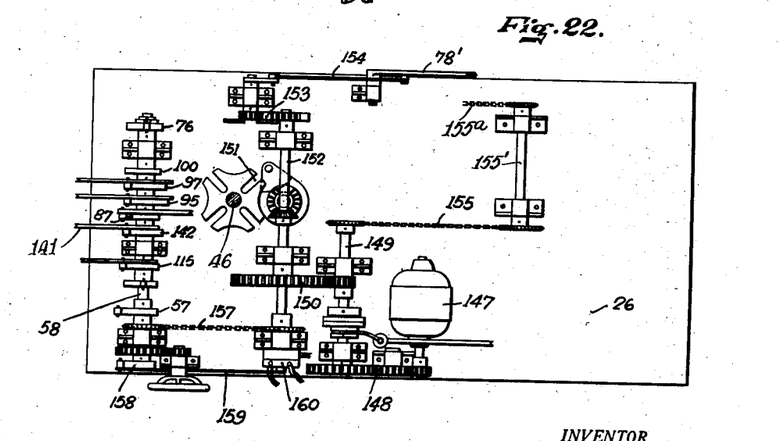
Fig. 22 is a bottom plan view of the controls in assembled condition.

Referring primarily to Fig. 1, the numeral 25 indicates a base above which a deck or frame 26, as shown in Figs. 9, 21 and 22, is suitably supported to carry the mechanism hereinafter described, it being noted that the mechanism proper is largely above such deck, while the controls therefor are conveniently disposed below the same.

Figure 2:
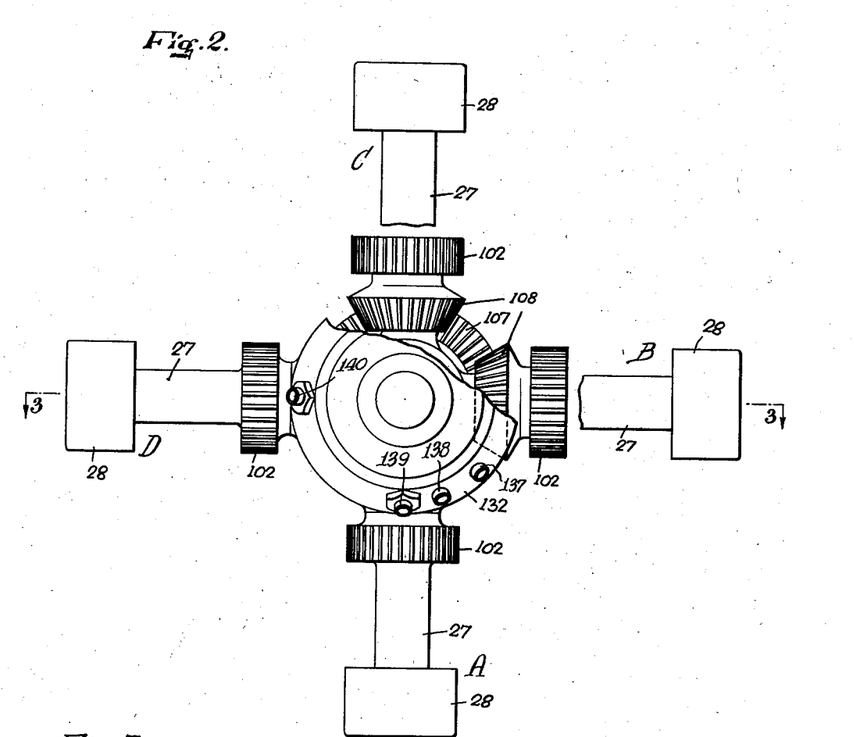
Fig. 2 is a plan view of the machine turret.
Figure 23:
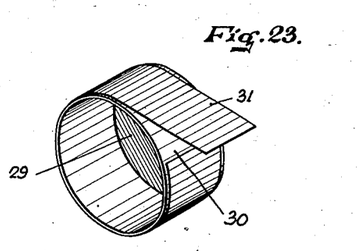
Fig. 23 shows an article in process of formation.

According to the embodiment illustrated, one of the main portions of the apparatus is a turret head such as shown in Figs. 2 and 21, and this head has extending from it arms 27 supporting at their outer ends mandrels 28. As shown, these mandrels are four in number and it is intended that the mechanism may preferably have four stations which may be generally identified as (A) receiving; (B) applying; (C) fixing and (D) discharge stations. At the first station (see Figs. 1, 20 and 21) a unit, preferably comprising a disc 29, and a side wall 30 is received by one of the mandrels. This unit is best illustrated at Fig. 23. At station B (see Fig. 9), a strip 31 is placed in proper relationship with respect to the side wall or flange 30. At station C (see Fig. 19) this strip is brought to a condition such that it will remain fixed with respect to the unit throughout the life of the latter, and at station D (see Fig. 21), the unit is discharged from the machine.

Figure 20:
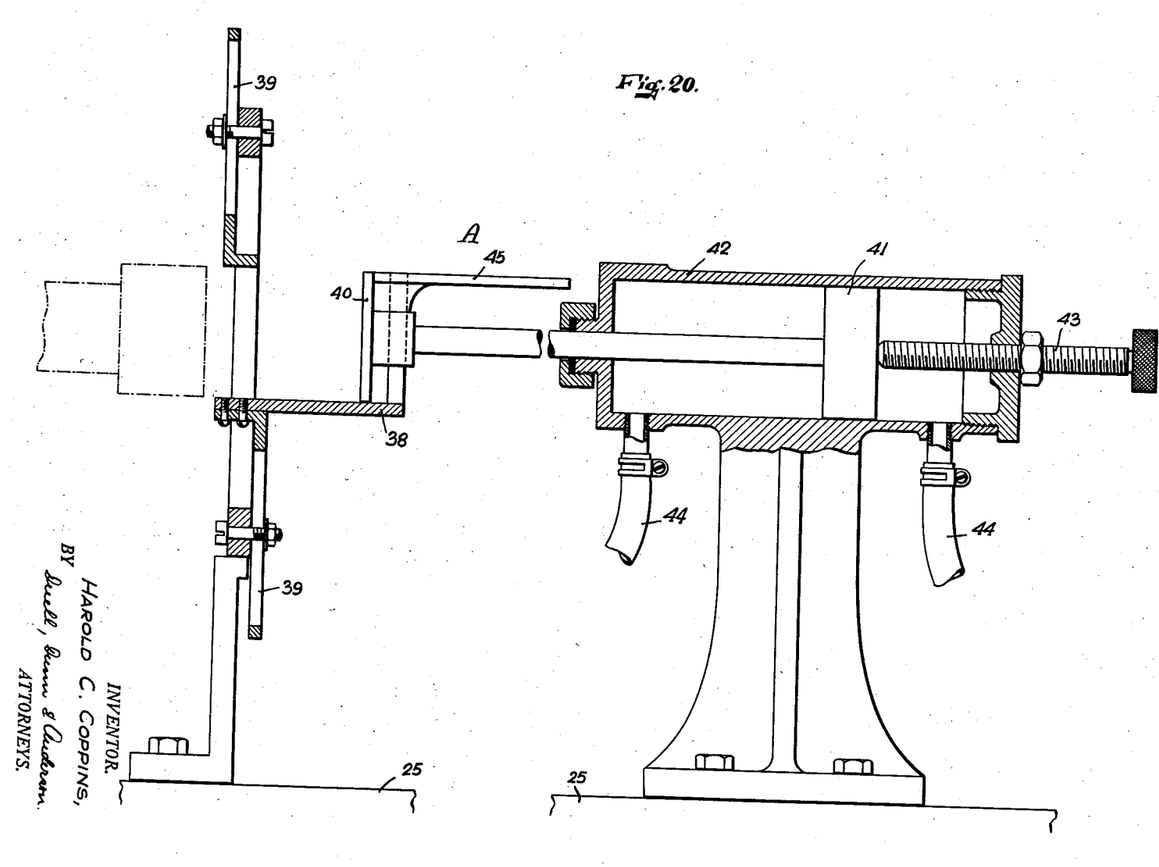
Fig. 20 is a sectional view of the mechanism adjacent the loading station of the turret.

For a more detailed understanding of the mechanism which comprises station A, reference is primarily had to Figs. 1 and 20, showing a rail or chute 32 supporting a series of receptacle units and which are guarded against accidental displacement by means, for example, of protecting side strips 33 which may be adjustably mounted by supports 34 extending from the chute. In order to guard against the possibility of receptacle units being superimposed one upon the other, a top or confining strip 35 may be disposed above the chute 32. The chute terminates in a downwardly extending portion 36 and an end wall 37 is provided which serves as a stop preventing the receptacle units from moving in a direction other than downward at this point. In order to allow the machine to accommodate different sizes of units, the end wall 37, the confining strip 35, and a series of stop members 38 may all be adjustably mounted on radially disposed circumferentially spaced, radially adjustable brackets 39. It is for this same purpose that the side strips 33 are also mounted for adjustment.

Regardless of this factor, however, it will be seen that by virtue of the chute member 32 and the end or stop wall 37 spaced from the end of the same, that a well is provided adjacent the lower end of the chute and which is of just sufficient area to receive one of the receptacle units.

Referring especially to Fig. 20, it will be noted that in line with this receiving well, a plunger 40 is provided which may be reciprocated by coupling the same to a piston 41 disposed in a cylinder 42. An adjustable stop member 43 may be associated with the piston and conduits 44 are connected to opposite ends of the cylinder and serve to conduct fluid under pressure thereto so as to reciprocate the piston 41 and consequently the plunger 40. It is obvious that any other desired mechanism might be employed for the purpose of reciprocating this plunger, but it is preferred that the latter move in contact with or immediately adjacent to the inner surface of the supporting strips 38 so that when it is projected the receptacle unit will be correspondingly moved. It will likewise be observed that the plunger may carry a supporting shelf 45 so that, as that receptacle unit (which was heretofore disposed within the chute-well) is displaced sidewise by the plunger, the receptacle unit above the same will not drop down until the plunger has been retracted.

Figures 3, 4, 5, 6:
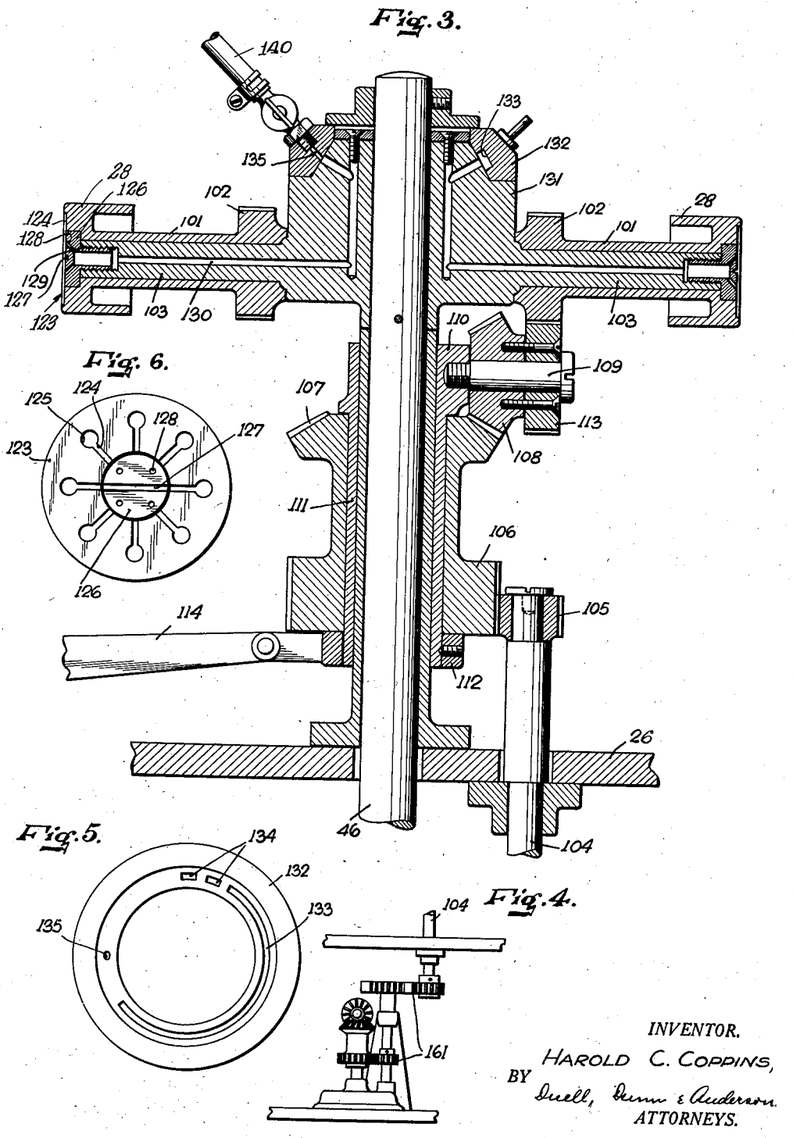
Fig. 3 is a sectional side view taken along the lines 3/3 of Fig. 2.
Fig. 4 shows the driving mechanism employed in connection with the turret.
Fig. 5 is a face view of the control head for the mandrels associated with such turret.
Fig. 6 is an enlarged face view of the mandrel end.

Thus, the unit is mounted upon the mandrel at station A and in condition for the machine to shift the mandrel to the next station. A certain other factor, hereinafter more particularly described, will contribute to the proper disposition of the receptacle unit with relation to the mandrel. In order to effect shifting of the turret so that the mandrel will be moved to the next station, reference is primarily had to Fig. 3, showing a shaft 46 supporting the turret head rotatable with the shaft. The mechanism for rotating this shaft is hereinafter described. The turret and shaft 46 connected thereto preferably have an intermittent movement which is through an arc of substantially 90° where four mandrels, as shown, are used. Thus the mandrel 28 moves at one step from station A where the box blank or unit is applied to station B where the next operation is performed.

Figure 10:
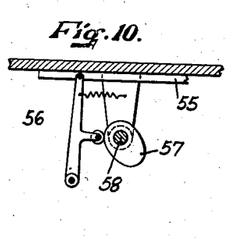
Figs. 10, 11, 12, 13, 14, 15, and 16 show details of controls connected to the mechanisms shown in Fig. 9.
Figure 11:
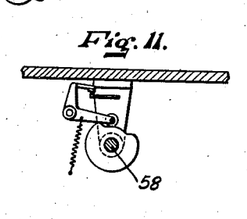

Referring now to Figs. 9 and 21, it will be noted that at station B the mandrel head 28 extends above the deck 26 and the latter supports a magazine housing a bank or stack of strips 31. It is preferred that this magazine include a platform 47 supported upon rods 48. The latter are connected to the ends of bellcrank levers 49 coupled for synchronized movement by a link 50. A shifting of the bellcrank levers to correspondingly elevate the platform 47 is effected by crank 51, which is connected to shaft 52 encircled by a split nut 53. This nut is rotated by means of a pawl and ratchet mechanism generally indicated at 54, and the pawl is shifted by a rod 55 which, as shown in Fig. 10, is connected to a spring return lever 56 in cooperation with a cam 57. Consequently, as the shaft 58, to which the cam is secured, is rotated, the rod 55 will be reciprocated to rotate the nut 53 intermittently, thus elevating the shaft 52 and correspondingly rocking the bellcrank levers 45. The pile of strips 31 upon the platform 47 are guarded against displacement by, for example, a series of prongs or fingers 59, with the inner faces of which they have sliding contact.

Overlying the strip magazine is a transfer mechanism comprising, in the embodiment illustrated, a perforated plate or casing 60 secured to a mounting 61. The latter is supported by vertically extending rods 62 which are normally urged upwardly by springs 63. These rods carry at their upper ends rollers 64 bearing against the under face of an actuating bar 65, supported by bellcranks 66 connected by a link 67 and shifted by a rod 68 controlling a crank arm 68' connected to the bell crank lever 66. The pivots 66' of these bellcrank levers are mounted upon supports 69 extending from the deck 26. Disposed below the actuating bar 65 is a track member 70 which guides the plate or casing 60 and its mounting in its movements to and fro. Secured to this plate is a distributor head 70' mounting a valve 71' actuated by a rocker arm 71, and which valve serves to control the action of air under pressure or a source of vacuum to the perforations of the plate 60 through tubes 72 and 73.

Figures 12, 13, 14, 15, 16, 18, 19:
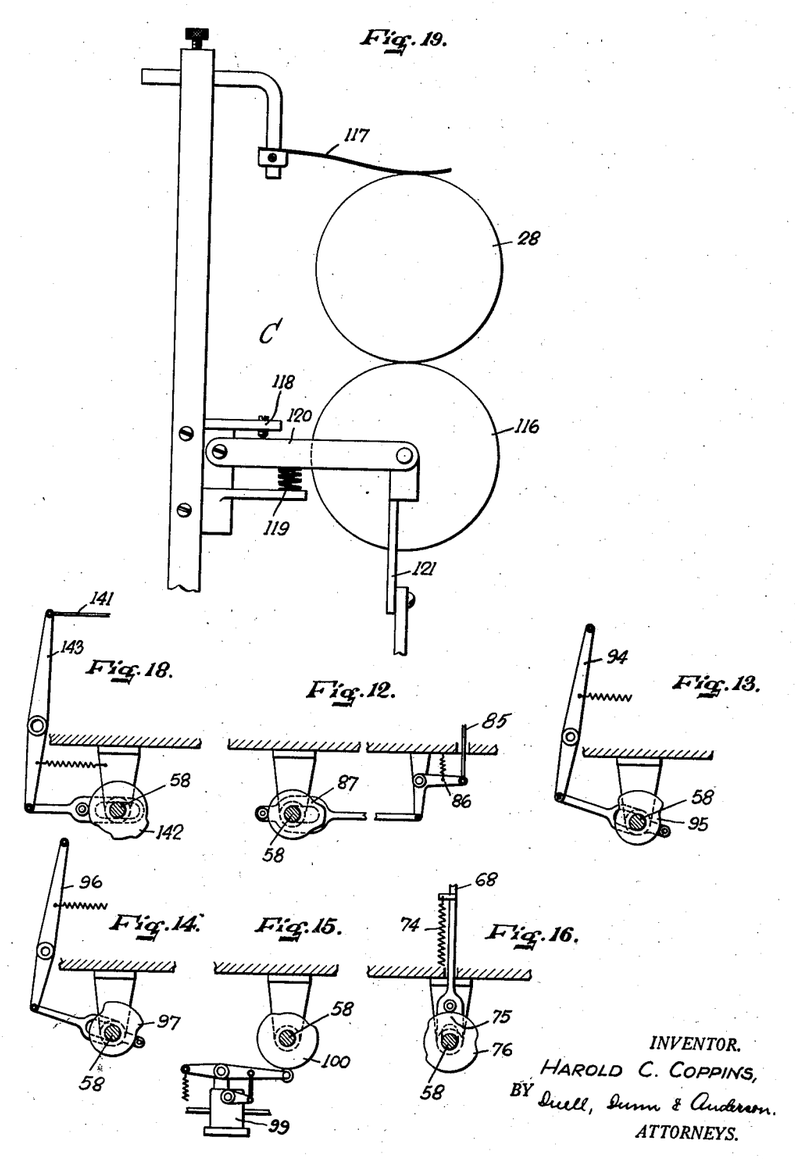
Figs. 17 and 18 are similar views, but showing the controls in connection with certain of the turret mechanisms.
Fig. 19 shows the wiping, or third station of the turret.

The rod 68 is reciprocated by a spring 74 shown in Fig. 16 and a follower 75 cooperating with a cam 76 secured to the shaft 58. Accordingly, as this shaft rotates, the bellcrank levers 66 are rocked to elevate and lower the actuating bar 65, and it will be noted that this bar is provided with operating lugs 77 which may cooperate with the valve actuator 71. Also, as best shown in Fig. 8, a rocking lever 78' is connected in a manner hereinafter described, and to the upper end of which is secured a link 79' suitably connected to the carriage which mounts the plate 60, so that this carriage will be reciprocated along the rail 70. Thus, the links 68 and 79' being timed for proper movement, it will be apparent that the bar 65 will move downwardly, thus opening the valve 71' to connect the vacuum source to the plate or suction head 60, resulting in an inrush of air through the perforations of the plate, and also projecting the latter into contact with the uppermost of the pile of strips 31. Consequently, the uppermost strip is caused to adhere to the underside of the plate 60 and the latter, together with its associates parts, is elevated and moves along the track 70 to a point adjacent the mandrel head 28. At this point the forward end of the actuator 71 will cooperate with the outer operating lug 77 to disconnect the plate 60 from the source of suction, and at the same time to connect the forward series of openings in the plate to the tube 73 with a source of air pressure to project at least the forward end of the strip from the plate towards the mandrel head. The actuating bar 65 now moves upwardly and the carriage is projected rearwardly, again assuming the position shown in Fig. 9.

To apply adhesive or to otherwise adhesively treat the under surface of the strip 31 while said strip is in transit from the stack to the mandrel, a treating roller 78 as shown in Fig. 9 is mounted upon the deck 26 above a glue pot 79, within which an immersion roller 80 rotates. The roller 78 while normally contacting with roller 80, is capable of being projected upwardly by virtue of the fact that its bearings 81 are slidably supported in a guideway 82 and are connected to a push rod or rods 83, which are in turn connected to a rocking beam 84, the position of which is controlled by a link 85, connected as in Fig. 12, to a bellcrank 86, which is shifted by a cam 87 associated with the shaft 58. The position of the roller 78 is also controlled by a solenoid structure hereinafter referred to. It is obvious that when the lever 84 is rocked by downward movement of the link 85, the roller will be projected upwardly to contact with the under face of the strip as the latter moves with the suction head 60 towards the mandrel head. In this manner the strips 31 carried by the head will be successively rendered adhesive in their transit to the point of application to box parts carried by the mandrel 28.

In order to assure the depositing of a strip in operative proximity to the mandrel head, it has heretofore been noted that the source of vacuum is disconnected from the plate or casing 60 as the latter reaches a position adjacent station B. It has also been noted that if desired, the forward openings of the plate may at that moment be connected to a source of compressed air, serving to forcibly separate the leading edge of the strip from the plate and the depositing of the body of such strip upon the support 88. A mechanism is shown in Fig. 9 for assuring proper initial strip application and proper continuance of strip application to the box part on the mandrel 28. As shown, this mechanism includes guideways 89 movably supporting carriages 90 and 91. Carriage 90 carries spring fingers 92 which serve to divert the leading edge and the body of the strip towards the body of the unit. The slide 91 carries one or more spring pressed wiping elements 93 which press the strip body into contact with the unit, as the mandrel head is rotated. In order that the spring plate or fingers 92 may not interfere with the proper depositing of the strip by the plate 60, the carriage 90 retracts at that time through operation of the arm 94 controlled by the cam and follower, identified at 95 in Fig. 13. The position of the carriage or slide 91 and its cooperation with the strip and mandrel head are likewise controlled by a rockingly mounted beam 96 coupled to a cam and follower 97, as shown particularly in Fig. 14. In order to assure that the leading edge of the strip will not assume a position to overlie the spring fingers or plate 92, an air nozzle or blower 98 may be positioned adjacent the mandrel head and serve to deliver an air blast above the strip to divert the leading edge of the same. The flow of air from this nozzle is controlled by a valve 99, in turn controlled by a cam and follower 100, as shown in Fig. 15, and which cam, in common with the cams shown in Figs. 13 and 14, is preferably secured to the shaft 58. The spring 92 is then moved into position to contact with the strip and to press it into position upon the mandrel 28 whereupon said strip is positively caused to adhere at its forward end to the blank mounted upon the mandrel.

Figure 17:
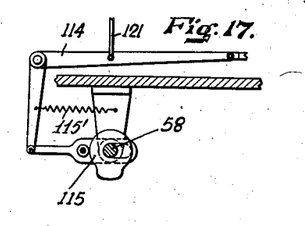

In order to rotate the mandrel head at station B, and also at the following station, a structure such as shown in Fig. 3 may be employed. In this figure it will be noted that the mandrel heads generally indicated at 28 are integral with tube portions 101 extending therefrom. Also, integrally or fixedly secured to such tube portions are gears 102 and the tube portions are mounted for rotation upon shafts 103 extending from the turret head. A rotary driving shaft 104 extends through the deck 26 and has a gear 105 secured to its upper end, which meshes with a gear 106 rotatably encircling the shaft 46. The gear 106 has a bevelled gear extension 107 and the teeth of this extension mesh with a similar gear 108 carried by a shaft 109 extending from a mounting block 110. This block is integral with or fixedly secured to a sleeve 111 interposed between the gear assembly 106—107 and the shaft 46 and carries at its lower end a collar 112 rotatably supporting the gear 106 so that when this sleeve is shifted it will correspondingly move as one unit the parts 106 to 112 inclusive. It will also serve to shift a spur gear 113 which is rotatably mounted upon the shaft 109 and attached to the bevel bear 108. If the shaft of sleeve 111 is downwardly, the gear 102 will not be driven, while if such shift is upwardly a driving of the gear 102, together with its associated head will follow. As shown in Figs. 2 and 3, the sleeve 111 carries shafts 109 and gears 108 and 113 at both stations B and C, it being accordingly obvious that in the embodiment illustrated, rotation of the mandrel heads may occur at only these stations. A clutching and declutching of the gears 102 and 113 is effected by rocking the arm of bellcrank lever 114, which is coupled to the sleeve 111. As shown in Fig. 17, this bellcrank lever is rocked by a cam and follower 115 and spring 115'; this cam being also secured to shaft 58. The parts are of course timed so that rotation of the mandrel head does not occur until after the spring pressed fingers or plate 92 at station B press the strip end into contact with the unit to which it is to be applied. Thereupon rotation occurs and the slide or carriage 91 is projected endwisely to assure proper contact between the exterior strip face and the spring pressed fingers 93. No rotation of the mandrel heads at stations A and D occurs and rotation at station C is of course interrupted while application of a strip to a unit at station B occurs, because of the downward rocking of bellcrank lever 114.

At station C, best shown in Fig. 19, a pressure roller 116 has rolling contact with and is spring pressed against the exterior face of the strip. At this station there is also provided a wiping strip 117 which overlies the mandrel head 28, for pressing the strip into permanent contact with the flange of the unit carried by the rotating head. Upward movement of the roller 116 may be limited by an adjustable stop 118, and such upward movement of the roller is assured by a spring 119 which constantly urges the arms 120 upwardly, these arms carrying the roller. To control the position of the arms there is connected to them one or more rods 121, which, as shown in Fig. 17, are connected to the arm of bellcrank lever 114, it being noted that the cam and follower 115 perform the dual function of controlling the pressure roller and also the rotation of the mandrel heads.

At station D the unit with the strip applied thereto is ejected. This discharge preferably occurs by applying air under pressure to the inner face of the unit and blowing the same clear of the mandrel head, and, as illustrated in Fig. 21, the completed article may be delivered to a chute 122 or other receiving means.

For a description of the air pressure and suction controls reference is made particularly to Figs. 3 and 6 showing the rotary mandrel or head 28 which has a circular surface 123 formed with a series of angularly spaced, radially extending channels 124 preferably terminating in enlarged recesses 125. Fluid is distributed to these channels through a central washer 126 seated in a recess in the head 28 and having a groove 127 and passages 128. The surface 123 being a part of the head 28, rotates therewith while the washer or plate 126 remains stationary, being secured by a screw-threaded stem 129 threadably engaging the shaft 103, which is provided with a bore or conduit 130, communicating with the bore of the stem. Consequently, the channels 124 may communicate with a source of fluid pressure or vacuum. The outer face of the washer 126 is preferably slightly below the surface 123 so that no frictional contact will occur between the washer and the box unit supported upon the mandrel head. This arrangement provides also for freer communication of the slots or passageways 124 with the openings 128, thus facilitating in distribution of the pneumatic control.

Figure 7:
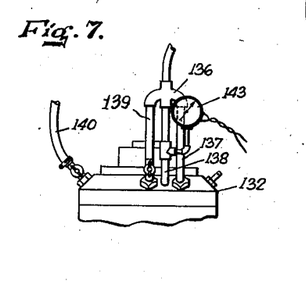
Fig. 7 shows the upper end of the turret, together with the vacuum and pressure supply pipes connected thereto.

The passages 130 are extended and continued through the turret head 131 and terminate on a preferably inclined outer surface of the latter. At this point the turret head is encircled by a ring 132 (see Figs. 3 and 5) which has a sliding fit with respect to the turret head and acts as a valve, as will be hereinafter more apparent. The inner face of this ring as shown in Fig. 5 has a groove 133 extending throughout substantially one-half of its circumference. In advance of this groove a pair of ports or openings 134 are provided and which openings lie in the extended arc of the groove 133. To the rear of the groove an opening or port 135 is provided and as best shown in Figs. 7 and 21, a manifold 136 is provided which is connected to a source of suction and which is continued in the form of three branches 137, 138 and 139 connected respectively to the ports 134 and the groove 133. The port or passage 135 is connected to a tube 140 coupled to a source of air pressure (not shown), and the entire ring 132 may be shifted by, for example, a link 141 connected to a cam and follower 142, best shown in Figs. 18 and 21, a rocker arm 143 being interposed between the cam and follower and the link.

Considering the action of the suction and pressure control just described, it will be understood that the cam and follower 142 are so timed that when one of the mandrel heads is adjacent station A, the ring 132 is shifted so that the tube or pipe 137 through the first of the ports 134 is connected to the passage 130 of this head. Consequently the package unit or other article which is being applied by means of the plunger 40 will have its inner face subjected to the action of suction to such an extent that this factor in itself would seat the unit upon the mandrel head. Thus, the unit will be maintained in properly applied position with reference to the head 28. Immediately thereafter the ring 132 through the link 141 will be shifted for an instant to connect tube or passage 138 to the second port 134. Thereafter the ring 132 will shift through link 141 so that the groove or passage 133 will be continuously connected to the upper end of passage 130 of this mandrel throughout the travel of the latter through stations B and C. Thereafter the ring 132 will again shift so that at station D passage 135 is connected to the passage 130, as a consequence of which air under pressure from tube 140 will pass through the conduit 130 to the outer face of the mandrel, thus unseating the blank or receptacle unit and ejecting it into the discharge chute 122.

If for some reason the mandrel head has not received a unit at station A, it will be obvious that no strip should be applied at station B. It is for this reason that passage 138 has been provided. Assuming that some failure has occurred in the supply of units, it will be apparent that when tube 138 is connected to the second port 134 the suction will be broken because air will be free to flow through the openings 128 without the seal or obstruction normally existing when the base or head of a box unit is overlying the plate 123 and the washer 126. By connecting a gauge 143 to the tube 138, it is obvious that this lack of seal will be registered by the gauge. Embraced in this member is a circuit closer (not shown) which under normal conditions of vacuum will be in closed condition, but which, if the suction is broken, will shift to open condition. The latter action will of necessity follow in the event that a unit is not in position upon the mandrel head when the second port 134 is connected to the passage 130 of that particular mandrel head. The circuit breaker is connected to a solenoid or electromagnet 144 which attracts armature 145 connected to rocker arm 84, as shown in Fig. 9. While the solenoid is not sufficiently powerful to raise the glue roller 78, it is sufficiently powerful to maintain the same in elevated condition after the arm 84 has been rocked by the link 85. Thus, the under face of any strip coupled to the plate 60 will be coated as the latter travels towards station B. However, if the circuit through solenoid 144 is broken, due to the fluctuation of the gauge 143, it will be apparent that the roller 78 will simply be raised by the link 85 and will immediately revert to the position shown in Fig. 9 before contact has occurred between the roller periphery and the strip. Consequently the strip will be uncoated and will not be applied to the mandrel 28 at station B. It will be noted that the adhesive roller 78 will be held in its raised position by the cam 87 for a brief period, but the raised part of the cam will have passed beyond the cam follower by the time that the second port 134 comes into alignment with the conduit 138. Consequently upon the lowering of the vacuum in this conduit due to absence of a receptacle unit or blank on the mandrel, the circuit will be opened and the electromagnet 144 deenergized with the result, as described, that the roller 78 remains in its lowered or inoperative position. In this position the paste or adhesive applying roller 78 is in position so that it does not contact with the pneumatic lifting plate 60 or with any other part of the mechanism, thus avoiding smearing of the machine parts with adhesive, and avoiding also coating any strip carried by said lifting plate.

Another control for the adhesive applicator 78 similar to that just described is also illustrated particularly in Fig. 9. As there shown, the vacuum tube 72 connected to the plate 60 communicates with a gauge 146 similar to gauge 143 and including a corresponding circuit-breaker. If for some reason a strip 31 is not in contact with the perforations of the under face of the plate 60, the gauge of the plate 146 will—upon the valve being thrown by the actuator 71—register a breaking of the suction line, as a consequence of which the circuit closer in the gauge 146 will open—thus breaking the circuit through solenoid 144 and causing the adhesive applicator 78 to remain in its lowered or inoperative position as above described in connection with operation of the gauge 143. Consequently, if no strip is present, the under face of the plate 60 will not be coated by contact with the roller 78.

Referring to the general driving mechanism, attention is primarily directed to Fig. 22. In this view a motor 147 is shown as affixed to the under face of the deck 26. This motor, through reduction gearing 148, serves to drive shaft 149, which, through reduction gearing 150, operates a Geneva stop movement 151 to the driven member of which shaft 46 of the turret is secured. Thus, it is obvious that with the motor operating, the turret head and mandrel secured thereto will be intermittently advanced. The shaft 152, to which the gearing 150 couples, also serves to drive a second Geneva stop movement 153 which, through a link 154 rocks the crank 78', as shown in Fig. 8. Also, as shown in this figure, as well as Fig. 22, the shaft 149 preferably operates driving connections 155, 155' 155a, extending through to a sprocket 156 coupled to the shaft which mounts the glue roller 78. The shaft 58 is connected to the shaft 152 by a sprocket drive 157 and at the end of this shaft a crank 158 is secured, which, through a link 159 drives a valve 160, to which are coupled the tubes 44 extending from the cylinder 42, as shown in Fig. 20. Thus, as shaft 58 revolves the valve 160 is alternately shifted to couple one side of this cylinder with a source of air pressure or vacuum and to connect the opposite side of the cylinder with the atmosphere.

While the operation of the improved mechanism has been set forth in the above detailed disclosure, for convenience a brief review thereof is given as follows: At station A box units in the chute 32 will be sequentially applied to the mandrel heads by operation of the plunger 40. If for any reason there is a failure of a box unit to be applied to a mandrel head 28, the adhesive applicator 78 will be caused to move downwardly out of adhesive applying position by virtue of the lowering of the pressure in conduit 138 (see Fig. 7), resulting in operation of the gauge 143 to open the electrical circuit to the electromagnet 144. The electromagnet is thus deenergized and its holding effect on the roll 78 will be discontinued. Consequently the roll will move downwardly either by gravity or otherwise into its non-applying position. Hence the strip 31, which is normally carried by the suction head 60 at station B will not be coated with adhesive as said suction head moves past the roller 78, and consequently the strip will not be pasted to the mandrel head 28 on which the box unit is absent. Similarly, if for any reason a strip 31 is not picked up by the suction head 60, the pressure will be lowered in the gauge 146 thus opening the circuit to the electromagnet 144 with the result that the applicator 78 moves into its inoperative position in a manner just described, thus preventing application of adhesive to the under surface of the suction head.

At station B the coated strip is brought to a position adjacent the side wall or flange of the unit and is pressed firmly into contact therewith and wiped around the same. This occurs due to the fact that at this station the mandrel head 28 is rotated after the end of the strip is once applied, such rotation occurring by means of the gearing 102, 113, 108, 106 and 105. It will of course be appreciated, as in Fig. 4, that the shaft 104 may be driven by the main drive, or otherwise suitably operated.

At station C, as shown in Fig. 19, the strip will again be pressed firmly into contact with the surface mounting the same and throughout its entire length. This, of course, occurs due to the continued rotation of the mandrel head, which thereupon is shifted to station D and the unit discharged therefrom.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. An apparatus of the character described, including, in combination, a movable member to mount an article to be operated upon, means for pressing the end of a strip onto said mounted article, means for stopping said mounting member and maintaining it stationary during such application, means for subsequently moving said mounting member and means cooperating with said article during such movement to assure the maintenance of proper relative positions of the article with respect to the strip.

2. An apparatus of the character described, including, in combination, a movable member to mount an article to be operated upon, means for pressing the end of a strip onto said mounted article, means for stopping said mounting member and maintaining it stationary during such application and means movable with respect to said mounting member and subsequently cooperating with the article on said mounting member to secure the body of said strip against movement with respect to the article.

3. An apparatus of the character described, including, in combination, a member to mount an article, means for transferring a supplemental article from a source of supply to said mounting member, means performing an operative cycle during said transfer to render said supplemental article adhesive, means for applying said latter article to said mounted article and means controlled by the absence of an article mounted by said member to cause said adhesive-rendering means to omit its operative cycle.

4. An apparatus of the character described, including, in combination, a member to mount an article, means for transferring a supplemental article from a source of supply to said mounting member, means acting during said transfer to treat said supplemental article, means for applying said latter article to said mounted article and means acting in the event of failure of supply of a supplemental article to render said treating means inoperative.

5. An apparatus of the character described, including a support to receive an article to be operated upon, a strip magazine, means for transferring a strip from said magazine to the article mounted upon said support, means cooperating with said transferring means to render operative, for application to an article, a strip supported thereby, means for applying the strip to said article, means for stopping said support and maintaining it substantially stationary during such application, and for subsequently moving it, and means cooperating directly with the article on said support during such movement to completely establish proper disposition of said strip with respect to said article.

6. An apparatus of the character described, including a support to receive an article to be operated upon, a strip magazine, means for transferring a strip from said magazine to the article mounted upon said support, means cooperating with said transferring means to render operative, for application to an article, a strip supported thereby, means for applying the strip to said article, means for stopping said support and maintaining it substantially stationary during such application, and for subsequently rotating it, and a yielding member mounted for retraction from operative position with reference to said support and cooperating with said strip, during such rotation, to establish the same in permanent contact with respect to said article.

7. An apparatus of the character described, including a support to receive an article to be operated upon, a strip magazine, means for transferring a strip from said magazine to the article mounted upon said support, means cooperating with said transferring means to render operative, for application to an article, a strip supported thereby, means for applying the strip to said article, means for stopping said support and maintaining it substantially stationary during such application, strip contacting means to cause said strip body to assume a fixed position with respect to said article, means for causing relative rotation between strip contact means and said support to bring the former into operative contact with said strip, and means for retracting said contacting means and moving it into operative relation with said support in timed sequence with movements of the latter.

8. An apparatus of the character described, including, in combination, a support for an article, means for shifting said support, a strip magazine, means for transferring strips from said magazine to a point adjacent said support, means cooperating with said transfer means to render said strip operative for application to an article, and means acting in the absence of an article, and in the absence of a strip, to render said last named means inoperative.

9. An apparatus of the character described, including, in combination, a support for an article, means for shifting said support, a strip magazine, means for transferring strips from said magazine to a point adjacent said support, means cooperating with said transfer means to render said strip operative for application to an article, and means acting in the absence of a strip to render said last named means inoperative.

10. An apparatus of the character described, including, in combination, a support for an article, means for shifting said support, a strip magazine, means for transferring strips from said magazine to a point adjacent said support, means cooperating with said transfer means to render said strip adhesive for application to an article, and means controlled by the absence of an article on said support to prevent said adhesive rendering means from performing an adhesive rendering function.

11. An apparatus of the character described, including a mandrel, means for delivering an article to said mandrel, applying means cooperating directly with the end of a strip to apply it to the article supported by means for holding said mandrel, said article and mandrel substantially stationary during such application, for subsequently rotating them, means contacting with said strip during such rotation to fix said strip against movement with respect to said article, and means supplementing said last named means, and subsequently cooperating with said strip and article, to assure the maintenance of a proper relationship between said article and strip.

12. An apparatus of the character described, including an article supporting mandrel, applying means cooperating directly with the end of a strip to apply it to the article supported by said mandrel, means for holding said article and mandrel substantially stationary during such application, and for subsequently rotating them, means contacting with said strip during such rotation to fix said strip against movement with respect to said article, further means subsequently cooperating with said strip to assure the maintenance of the same with respect to said article, and means for causing relative rotation between said mandrel and said last named means.

13. An apparatus of the character described, including an article supporting member, a magazine for units to be applied to such articles, means for transferring such units from said magazine to a position adjacent said supporting member, moisture applying means for said units, means for shifting said applying means to operative position, means for maintaining said applying means in such position whereby it may cooperate with said units during such transfer, and means for rendering said maintaining means inoperative in the absence of a unit and article.

14. An apparatus of the character described, including an article supporting member, a magazine for units to be applied to such articles, means for transferring such units from said magazine to a position adjacent said supporting member, moisture applying means for said units, means for shifting said applying means to operative position, means for maintaining said applying means in such position whereby it may cooperate with said units during such transfer, and means for rendering said maintaining means inoperative in the absence of a unit from said transferring means.

15. An apparatus of the character described, including an article supporting member, a magazine for units to be applied to such articles, means for transferring such units from said magazine to a position adjacent said first named means, means for rendering the units adhesive, means for shifting said adhesive rendering means to operative position, means for maintaining said adhesive rendering means in cooperative position to contact along said units during such transfer, and means for rendering said maintaining means inoperative and to move said adhesive rendering means away from its cooperative position in the absence of an article in association with said supporting member.

16. In an apparatus of the character described, in combination, a movably mounted mandrel for carrying a blank, means for transferring a strip into position for application to a blank on said mandrel, means for holding the strip on said transferring means during transfer and for releasing it when in position for application to the blank on said mandrel and pneumatic means for urging the strip into contact with said blank.

17. In an apparatus of the character described, in combination, a movably mounted mandrel for carrying a blank, means for transferring a strip into position for application to a blank on said mandrel, pneumatic means for urging the strip into contact with said blank, a movably mounted supplemental device for urging the strip against said blank, and means for moving said supplemental device into operative position in timed sequence with operation of said pneumatic means.

18. In an apparatus of the character described, in combination, a movably mounted mandrel for carrying a blank, means for transferring a strip into position for application to a blank on said mandrel, a pneumatic holding device for holding the strip on said transferring means, pneumatic means for urging the strip into contact with said blank, and means for stopping said mandrel and maintaining it stationary during operation of said pneumatic device.

19. In an apparatus of the character described, in combination, a movably mounted mandrel for carrying a blank, means for transferring a strip into position for application to a blank on said mandrel, pneumatic means for urging the strip into contact with said blank, a movably mounted supplemental device for urging the strip against said blank, means for moving said supplemental device into operative position in timed sequence with operation of said pneumatic means, and means for stopping said mandrel and maintaining it stationary during operation of said pneumatic means and of said supplemental device.

20. In an apparatus of the character described, in combination, a movably mounted mandrel for carrying a blank, means for transferring a strip into position for application to a blank on said mandrel, pneumatic and supplemental resilient means for urging the strip into contact with said blank, and means for shifting said supplemental means to and from operative position in predetermined time sequence.

21. In an apparatus of the character described, in combination, a movably mounted mandrel for carrying a blank, means for transferring a strip into position for application to a blank on said mandrel, pneumatic and supplemental resilient means adjacent to each other for urging the strip into contact with said blank, and means for rendering said resilient means inoperative during initial operation of said pneumatic means.

22. In an apparatus of the character described, in combination, a movably mounted mandrel for carrying a blank, means for transferring a strip into position for application to a blank on said mandrel, pneumatic and supplemental resilient means for urging the strip into contact with said blank, mounting means mounting said resilient means for movement to and from operative position, and means for moving said resilient means into operative position in sequence with operation of said pneumatic means.

23. In an apparatus of the character described, in combination, a movably mounted mandrel for carrying a blank, means for transferring a strip into position for application to a blank on said mandrel, pneumatic means for urging the strip into contact with said blank, a supplemental strip pressing device adjacent said pneumatic means and operated in sequence with the latter for pressing the strip against the blank, and means for rendering said strip adhesive during the transfer thereof to said blank.

24. In an apparatus of the character described, in combination, a movably mounted mandrel for carrying a blank, means for transferring a strip into position for application to a blank on said mandrel, pneumatic means for urging the strip into contact with said blank, means for rendering said strip adhesive during the transfer thereof to said blank, and a pneumatically controlled means for causing said adhesive rendering means to be inoperative upon failure either of the blank or the strip.

25. In an apparatus of the character described, in combination, a movably mounted mandrel for carrying a blank, a pneumatic transfer device for transferring a strip into position for application to a blank on said mandrel, means for connecting said transfer device to a source of vacuum supply for holding the strip during transfer, and means for connecting said transfer device to a source of fluid pressure so as to eject the strip from the transfer device onto said mandrel following transfer.

26. In an apparatus of the character described, in combination, a movably mounted mandrel for carrying a blank, a pneumatic transfer device for transferring a strip into position for application to a blank on said mandrel, means for connecting said transfer device to a source of vacuum supply for holding the strip during transfer, means for connecting said transfer device to a source of fluid pressure so as to eject the strip from the transfer device onto said mandrel following transfer, means for attaching the strip to the blank, and pneumatically controlled means for rendering said attaching means ineffective in the absence of a strip from said transfer device.

27. In an apparatus of the character described, in combination, a movably mounted mandrel for carrying a blank, means for transferring a strip into position for application to a blank on said mandrel, means for applying adhesive to cause the strip to adhere to the blank, and means to prevent adhesive application by said applying means in the absence of a blank from the mandrel or in the absence of a strip from the transfer means.

28. In an apparatus of the character described, in combination, a movably mounted mandrel for carrying a blank, means for transferring a strip into position for application to a blank on said mandrel, means for applying adhesive to cause the strip to adhere to the blank, means mounting said adhesive applying means for movement into positions wherein it is operative to apply adhesive or wherein it is inoperative to apply adhesive, and means to cause said applying means to assume its inoperative position in the absence of a blank from the mandrel or in the absence of a strip from the transfer means.

29. In an apparatus of the character described, in combination, a movably mounted mandrel for carrying a blank, means for transferring a strip into position for application to a blank on said mandrel, means for applying adhesive to cause the strip to adhere to the blank, means mounting said adhesive applying means for movement into positions wherein it is operative to apply adhesive or wherein it is inoperative to apply adhesive, pneumatic means for holding said blank in association with said mandrel, and pneumatically controlled means connected to said pneumatic means to cause said applying means to assume its inoperative position in the absence of a blank on said mandrel.

30. In an apparatus of the character described, in combination, a rotary turret carrying mandrels for blanks and having a head, a valve member movably mounted on said head and normally restrained from rotation, therewith, conduits, between said head and mandrels, means for connecting said valve with sources of vacuum and fluid pressure, an elongated port and two other ports spaced therefrom on said valve member, each said port being connected to one of said sources, and means for controlling said valve to sequentially connect the respective mandrels through said conduits with the vacuum and fluid pressure.

31. In an apparatus of the characted described, in combination, a movable mounting member to mount an article to be operated upon, means for moving said mounting member and for stopping it and maintaining it stationary for a period, and applying means for applying a strip to an article carried by said mounting member, said applying means including a device cooperating solely with the end of said strip to urge it laterally against the article during said stationary period.

32. In an apparatus of the character described, in combination, an adhesive applicator mounted for movement into applying and non-applying positions, means for moving said applicator into applying position, holding means for holding said applicator in its applying position after movement thereto by said moving means, and automatic means for releasing said holding means in the absence of a blank being acted upon so as to cause said applicator to move into non-applying position.

33. In an apparatus of the character described, in combination, an adhesive applicator mounted for movement into applying and non-applying positions, means for moving said applicator into applying position, an electromagnetic holding device for holding said applicator in its applying position after movement thereto by said moving means, and pneumatic control means for releasing said electromagnetic holding means so as to cause said applicator to move into non-applying position.

34. In an apparatus of the character described, in combination, a mandrel for supporting blanks, transfer means for transferring strips into position for application respectively to blanks on said mandrel, an applicator mounted for movement into applying and non-applying positions, means for moving said applicator into applying position, holding means for holding said applicator in its applying position after movement thereto by said moving means, and means automatically controlled through said mandrel for releasing said holding means.

35. In an apparatus of the character described, in combination, a mandrel for supporting blanks, transfer means for transferring strips into position for application respectively to blanks on said mandrel, an applicator mounted for movement into applying and non-applying positions, means for moving said applicator into applying position, holding means for holding said applicator in its applying position after movement thereto by said moving means, and means automaticaly controlled through said transfer means for releasing said holding means.

36. In an apparatus of the character described, in combination, a mandrel for supporting blanks, transfer means for transferring strips into position for application respectively to blanks on said mandrel, an applicator mounted for movement into applying and non-applying positions, means for moving said applicator into applying position, holding means for holding said applicator in its applying position after movement thereto by said moving means, and means automatically controlled jointly through said mandrel and through said transfer means for releasing said holding means.

37. In an apparatus of the character described, in combination, a mandrel for supporting blanks, transfer means for transferring strips into position for application respectively to blanks on said mandrel, an applicator mounted for movement into applying and non-applying positions, means for moving said applicator into applying position, holding means for holding said applicator in its applying position after movement thereto by said moving means, pneumatic strip retaining means associated with said transfer means for holding the strip to the transfer means during transfer, and pneumatic control means connected to said strip retaining means and responsive to strip failure on said transfer means for releasing said holding means.

38. In an apparatus of the character described, in combination, a mandrel for supporting blanks, transfer means for transferring strips into position for application respectively to blanks on said mandrel, an applicator mounted for movement into applying and non-applying positions, means for moving said applicator into applying position, holding means for holding said applicator in its applying position after movement thereto by said moving means, pneumatic blank-retaining means for retaining a blank on said mandrel and pneumatic control means connected to the pneumatic means of said mandrel and responsive to blank failure on said mandrel, for releasing said holding means.

39. In an apparatus of the character described, in combination, an applicator for rendering an article adhesive and mounted for movement into applying and non-applying positions, and pneumatic means automatically controlled by article absence for causing said applicator to assume non-applying position.

40. In an apparatus of the character described, in combination, a transfer device for transferring a strip, pneumatic means for holding a strip on said transfer device, and automatic means for connecting said pneumatic means with a vacuum source in one position of said transfer device and for connecting it with a source of fluid pressure in another position of said transfer device so as to blow one edge portion of the strip into position on a receptacle unit.

41. In an apparatus of the character described, in combination, a rotary turret carrying mandrels for blanks and having a head, a valve member movably mounted on said head and normally restrained from rotation therewith, conduits between said head and mandrels, means including a conduit having plural branches for connecting said valve with sources of vacuum and fluid pressure, and means for controlling said valve to sequentially connect the respective mandrels through said conduits with the sources of vacuum and fluid pressure.

42. In an apparatus of the character described, in combination, a rotary turret carrying mandrels for blanks and having a head, a valve member movably mounted on said head and normally restrained from rotation therewith, conduits between said head and mandrels, means including a conduit having plural branches for connecting said valve with sources of vacuum and fluid pressure, and means for controlling said valve to sequentially connect the respective mandrels through said conduits with the sources of vacuum and fluid pressure, and an automatic control element connected to one of the branches of said conduit.

43. In an apparatus of the character described, in combination, a rotary turret carrying mandrels for blanks and having a head, a valve member movably mounted on said head and normally restrained from rotation therewith, conduits between said head and mandrels, means including a conduit having a plurality of branches for connecting said valve with sources of vacuum and fluid pressure, an elongated port and two other ports spaced therefrom on said valve member, each said port being connected to one of said sources by means including said conduit with plural branches, and means for controlling said valve to sequentially connect the respective mandrels through said conduits with the sources of vacuum and fluid pressure.

44. In an apparatus of the character described, in combination, a rotary turret carrying mandrels for blanks and having a head, a valve member movably mounted on said head and normally restrained from rotation therewith, conduits between said head and mandrels, means including a conduit having a plurality of branches for connecting said valve with sources of vacuum and fluid pressure, an elongated port and two other ports spaced therefrom on said valve member, each said port being connected to one of said sources by means including said conduit with plural branches, means for controlling said valve to sequentially connect the respective mandrels through said conduits with the sources of vacuum and fluid pressure, and an automatic control element communicating with one of said branches of said conduit which is connected to one of said spaced ports.

45. In an apparatus of the character described, in combination, a rotary turret carrying mandrels for blanks and having a head, a valve member movably mounted on said head and normally restrained from rotation therewith, conduits between said heads and mandrels, an elongated port and other ports spaced therefrom on said valve member, means connecting said valve through said ports with sources of fluid pressure and vacuum, said connecting means including a plural branch conduit connected to the vacuum source and communicating with said elongated port and two of said spaced ports, means for controlling said valve to connect the mandrels with said sources through said conduits and an automatically controlled element communicating with a branch of said plural branch conduit which is connected to one of said spaced portions.

46. In an apparatus of the character described, in combination, a plurality of movably mounted mandrels for carrying blanks, means including a control valve member having ports for connecting said mandrels with a source of fluid power, a conduit having plural branches connected respectively to the ports of said valve, and an automatic control element communicating with one of the branches of said conduit.

47. In an apparatus of the character described, in combination, a plurality of movably mounted mandrels for carrying blanks, means including a control valve member having ports for connecting said mandrels with a source of fluid power, one of said ports being elongated and two others being spaced therefrom, a conduit having plural branches connected respectively to said elongated and spaced ports, an automatic control element communicating with one of the branches of said conduit, and means for controlling the valve to connect the fluid power to the different mandrels.

48. In an apparatus of the character described, in combination, an adhesive applicator mounted for movement into applying and non-applying positions, means for moving said applicator into applying position, holding means for holding said applicator in its applying position after movement thereto by said moving means, and pneumatic means controlled automatically in the absence of a blank being acted upon for releasing said holding means so as to cause said applicator to move into non-applying position.

49. In an apparatus of the character described, in combination, a plurality of blank supports mounted for movement into different stations, means for applying a blank to one of said supports at one station, means for rendering adhesive a second blank and adhesively applying it to the first mentioned blank at another station, and means for causing said last mentioned means to omit its adhesive and applying function at said last mentioned station upon failure to apply a proper blank at said one station.

50. In an apparatus of the character described, in combination, a plurality of blank supports mounted for movement into different stations, means for applying a blank to one of said supports at one station, means for rendering adhesive a second blank and adhesively applying it to the first mentioned blank at another station, pneumatic means for retaining blanks on said supports, and pneumatic blank controlled means connected to said pneumatic means for causing said adhesive means to omit its adhesive function.

HAROLD C. COPPINS.